Figure 1:
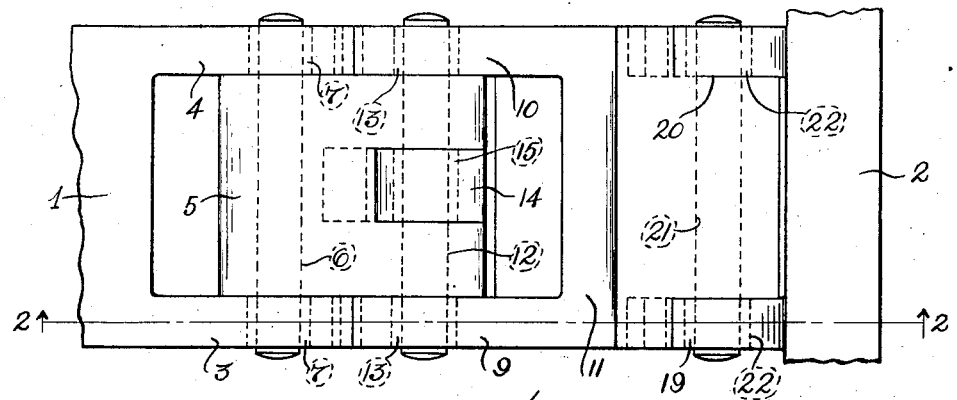

Jan. 9, 1940.    N. LESTER    2,186,030

TOGGLE LINK

Filed April 30, 1937

INVENTOR.
Nathan Lester
BY
Pfaff, Oberlin & Pfaff
ATTORNEYS

Patented Jan. 9, 1940

2,186,030

UNITED STATES PATENT OFFICE 2,186,030

TOGGLE LINK

Nathan Lester, Cleveland Heights, Ohio, assignor to The Lester Engineering Company, Cleveland, Ohio, a corporation of Ohio Application April 30, 1937, Serial No. 140,069

9 Claims. (Cl. 74—520)

The present invention relates to an improved form of construction of a toggle link mechanism for moving and exerting pressure between two relatively movable members such as the dies or molds in pressure casting, forging, stamping and molding machines.

The general object and nature of the invention is to provide means whereby pressure sustained by the toggle links when in locked, extended or "dead center" position is transmitted substantially entirely into compressive stress instead of shearing stress, with the result that not only is a toggle link mechanism of a given size capable of withstanding greater operating pressures, but also possesses a longer life, durability and freedom from failure.

Since the operation of a toggle link mechanism, and the mechanical advantage obtainable thereby, is dependent upon the application of a prime moving force in a direction transverse to the resultant force, or, in other words, upon the transverse movement of a movable pivot point, and in order to permit reciprocating force through the toggle link mechanism, it is necessary that the links be joined by pivot pins extending transversely to the direction of application of the maximum force. Therefore, and in prior constructions, such pivot pins have been compelled to sustain the maximum force exerted upon the toggle link mechanism in the form of shearing stress. The result of course has led to the breaking and failure of such pivot pins during operation. One method of attempting to overcome such difficulty has been to strengthen the pins by making them of larger diameter. But such increase in size of the pivot pins not only necessitates increased cost but also results in greater frictional resistance to the movement of the mechanism with incident decreased efficiency.

In the construction embodied in my present invention, I provide abutting surfaces and shoulders on adjacent links and connecting elements which are adapted to move into contacting relationship when the mechanism is in locked or extended position whereby end to end pressure heretofore exerted as shearing stress on the pivot pins is sustained as compressive stress by the elements of the mechanism.

A further object of the invention is to provide hardened metal inserts for preventing excessive wear on sliding and contacting parts. My novel construction also embodies means for "shunting out" or eliminating load pressure on one of the links when the mechanism is in locked or extended position.

To the accomplishment of the foregoing and related ends, said invention, then, consists of the means hereinafter fully described and particularly pointed out in the claims.

The annexed drawing and the following description set forth in detail certain mechanism embodying the invention, such disclosed means constituting, however, but one of various mechanical forms in which the principle of the invention may be used.

Figure 2:
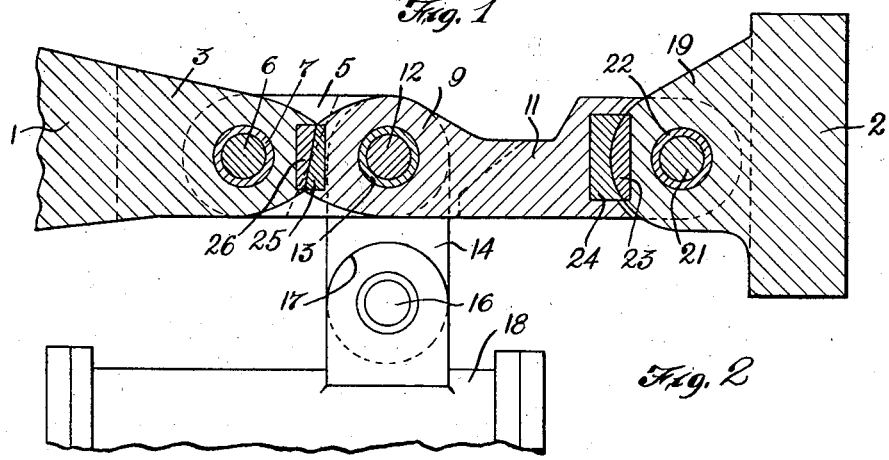
Figure 3:
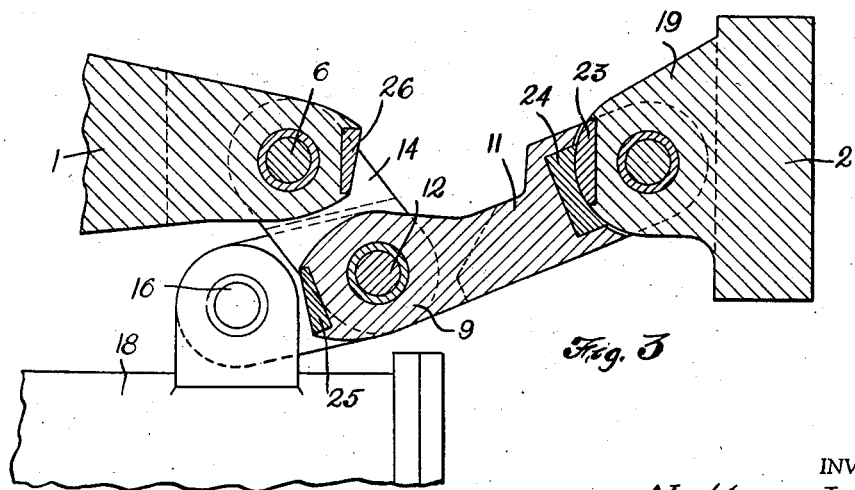

In said annexed drawing:

Fig. 1 is a top plan view of a toggle link mechanism embodying the principle of my invention; Fig. 2 is a sectioned, elevational view taken substantially along line 2—2 of Fig. 1, and showing the mechanism in locked or extended position; and Fig. 3 is a view taken similar to that of Fig. 2 but showing the mechanism in unlocked or collapsed position.

Now referring more particularly to the drawing, there are shown therein two relatively movable, spaced members 1 and 2. The member 1, for example, may be fixed and stationary, such as part of the frame of a pressure casting machine and the member 2 may be movable with respect to the member 1, such as the die plate of a pressure casting machine. The member 1 has a pair of projecting arms 3 and 4 to which the link 5 is pivotally connected by means of the transverse pivot pin 6. Bushings 7 mounted in the arms 3 and 4 serve as bearings for the rotative movement of the pin 6.

The link 5 is in turn pivotally connected to the spaced arms 9 and 10 of the link 11 by means of the pivot pin 12. Bushings 13 provide bearing surfaces for the pin 12 in the link arms 9 and 10. The links 5 and 11 are also connected to the link 14 by means of the pivot pin 12 mounted in the bushing 15; and the other end of the link 14 is connected by means of the pin 16 to a pair of bosses 17 (only one of which is shown) on the hydraulic cylinder 18. The hydraulic cylinder 18 is reciprocable in a direction parallel to the direction of movement of the member 2 and is mounted on a fixed piston and piston rod (not shown). Any other suitable prime moving means for reciprocating the lower end of the link 14 can of course be employed within the scope and principle of my invention.

The link 11 is also connected to the arms 19 and 20 of the movable member 2 by means of the pivot pin 21 mounted in the bushings 22.

Arcuately shaped shoulders are provided on the link 11 and have the hardened metal inserts 24 mounted therein which are adapted to bear against a correspondingly formed portion of the arms 19 and 20. Hardened metal inserts 23 are also mounted in the face of the arms 19 and 20. On the opposite end of the link 11 abutting surface, composed of the hardened metal insert 25, is provided which is adapted to contact with the similarly shaped surface on the arms 3 and 4 of the member 1, composed of the hardened metal inserts 26. The surfaces of the abutting portions composed of the inserts 25 and 26, are plane rather than arcuate and their meeting line is slightly angularly inclined from the vertical, or inclined toward the center of the pivot about which the link 5 rotates, so as to accommodate the collapsing movement of the toggle link mechanism. It will thus be seen, by reference to Figs. 2 and 3, that when the above described mechanism is moved from unlocked to locked or extended position (viz., from the position shown in Fig. 3 to that shown in Fig. 2) that the link 11 moves into a position where it bridges the movable members 1 and 2 in end to end abutting contact. Thus, the resultant maximum pressure exerted between the members 1 and 2 is substantially entirely transmitted as compressive stress against the link 11 whereby shearing stress on the pivot pins 6, 12, and 21 is eliminated. The angular contact between the abutting surfaces of the inserts 25 and 26 is effective to produce a wedging action during the final movement of the mechanism into locked position and thereby to relieve even the shearing stress which is exerted upon the pivot pins 6, 12, and 21 during previous movement of the mechanism.

The term "wedging action" as here employed is not the same as that type of action which customarily occurs when inclined surfaces are moved in a parallel direction with each other, since as obviously will be understood by reference to Figs. 2 and 3, the inclined abutment surfaces on the inserts 25 and 26 move in an arcuate path with respect to each other and of course do not come in contact until the toggle link mechanism just approaches dead center and the members 1 and 2 reach substantially fully extended position. In other words, whatever "wedging action" occurs between the surfaces of the inserts 25 and 26 is only of such extent as to relieve the shearing stress upon the pivot pins 6 and 12.

It will also be seen that when the parts have reached their position as shown in Fig. 2 that any stress or load pressure is no longer exerted upon the link 5, since such pressure is "shunted" past such link and transmitted directly from the member 1 to the link 11 to the member 2.

Other modes of applying the principle of my invention may be employed instead of the one explained, change being made as regards the mechanism herein disclosed, provided the means stated by any of the following claims or the equivalent of such stated means be employed.

I therefore particularly point out and distinctly claim as my invention:

1. In a toggle link mechanism, the combination of two spaced relatively movable members, and links pivotally connected to each other and joining said members, one of said links being movable into and out of an abutting position between, and in contact with, both of said members.

2. In a toggle link mechanism, the combination of two spaced relatively movable members, and links pivotally connected to each other and joining said members, one of said links having end portions adapted to bear against said members.

3. In a toggle link mechanism, the combination of two spaced relatively movable members, links pivotally connected to each other and joining said members, one of said links having end portions adapted to bear against said members, and hardened metal inserts mounted in said end portions and in the correspondingly contacted portions of said members.

4. In a toggle link mechanism, the combination of two spaced relatively movable members, links pivotally connected to each other and joining said members, shoulders on said members, and corresponding shoulders on one of said links adapted to abut against said first-named shoulders when said mechanism is in extended position whereby such link bridges the space between said members.

5. In a toggle link mechanism, the combination of two spaced relatively movable members, links pivotally connected to each other and joining said members, one of said links having an arcuate shaped end portion bearing against a correspondingly shaped portion of one of said members, said one of said links also having a plane surface end portion at its other end adapted to bear against a similarly shaped portion on the other of said members.

6. In a toggle link mechanism, the combination of two spaced relatively movable members, links pivotally connected to each other and joining said members, one of said links having an arcuate shaped end portion bearing against a correspondingly shaped portion of one of said members, said one of said links also having a plane surface end portion at its other end adapted to bear against a similarly shaped portion on the other of said members, and hardened metal inserts in said end portions and in said correspondingly shaped portions.

7. In a toggle link mechanism, the combination of two spaced relatively movable members, and links pivotally connected to each other and joining said members, one of said members having an abutment surface angularly inclined to the direction of movement thereof, and one of said links having a complementary end abutment surface adapted to bear against said first-named abutment surface when said members are in fully extended position.

8. In a toggle link mechanism, the combination of two spaced relatively movable members, links pivotally connected to each other and joining said members, one of said links having an arcuate shaped end portion bearing against a correspondingly shaped portion of one of said members, said one of said links also having a plane surface end portion at its other end adapted to bear against a similarly shaped portion on the other of said members, the meeting line between said plane surface end portion and said similarly shaped portion being angularly inclined to the direction of movement of said members.

9. In a toggle link mechanism, the combination of two spaced relatively movable members, links pivotally connected to each other and joining said members, one of said links having an arcuate shaped end portion bearing against a correspondingly shaped portion of one of said members, the other of said members having a plane abutment surface angularly inclined to the direction of movement thereof, and said one of said links also having a complementary plane abutment surface on its other end adapted to bear against said first-named abutment surface when said members are in fully extended position.

NATHAN LESTER.